April 15, 1952     L. SVENDSGAARD     2,592,761
COFFEE URN Filed April 2, 1948     7 Sheets-Sheet 1

INVENTOR.
LARS SVENDSGAARD.
BY
Bruce & Brosler
HIS ATTORNEYS

April 15, 1952     L. SVENDSGAARD     2,592,761
COFFEE URN Filed April 2, 1948     7 Sheets-Sheet 2

INVENTOR.
LARS SVENDSGAARD
BY
Bruce & Brosler
HIS ATTORNEYS

INVENTOR.
LARS SVENDSGAARD
BY
Bruce & Broeler
HIS ATTORNEYS

April 15, 1952 L. SVENDSGAARD 2,592,761
COFFEE URN
Filed April 2, 1948 7 Sheets-Sheet 7

INVENTOR.
LARS SVENDSGAARD
BY
HIS ATTORNEYS

Patented Apr. 15, 1952

2,592,761

UNITED STATES PATENT OFFICE 2,592,761

COFFEE URN

Lars Svendsgaard, Berkeley, Calif.

Application April 2, 1948, Serial No. 18,625

12 Claims. (Cl. 99—283)

My invention relates to the brewing of coffee, and more particularly to apparatus for this purpose.

Among the objects of my invention are:

(1) To provide a novel and improved apparatus for the brewing of coffee;

(2) To provide a novel and improved coffee urn;

(3) To provide a novel and improved coffee urn adapted to continuously brew a supply of coffee;

(4) To provide a novel and improved coffee urn which will automatically brew coffee;

(5) To provide a novel and improved coffee urn which will brew coffee to a uniform high standard;

(6) To provide a novel and improved coffee urn whose output capacity may be adjusted within a practical range;

(7) To provide a novel and improved coffee urn which is entirely automatic in operation and which may be readily cleaned and serviced;

(8) To provide a novel and improved coffee brewing apparatus which will automatically shut down in the absence of any factor essential to the brewing of good coffee;

(9) To provide a novel and improved coffee brewing apparatus which will complete a prevailing brewing cycle before shutting down;

(10) To provide a novel and improved brewing apparatus having a positive brewing period.

Additional objects of my invention will be brought out in the following description of a preferred embodiment of the same taken in conjunction with the accompanying drawings wherein—

Referring to the drawings for details of my invention in its preferred form as illustrated, the internal mechanism of the urn is housed in a casing 1 having front, rear and end walls 3, 5, 7 and 9 respectively. These are preferably insulated against the passage of heat, and a cover 11 is provided which is also preferably heat insulated.

The casing is divided off by a partition 13 into a U-shaped hot water compartment 15, the greater section 17 thereof lying at one end of the casing and joining at one extremity with a narrow compartment section 19 along a portion of the rear wall, and at its other extremity with a similar narrow compartment section 21 along a portion of the front wall of the casing.

Journaled in bearings 23 and 25 affixed at opposite points on the front and rear walls of the casing is a basket wheel 27. This wheel comprises a pair of circular side plates 29, 31 connected centrally by a hollow cylindrical core 33 adapted to receive a shaft 35 that is keyed to the core and supports the wheel in the aforementioned bearings.

A plurality of radial partitions 37 emanating from the core, terminate adjacent the rim of the wheel in end portions 39 angularly deflected in the direction of intended rotation of the wheel. These partitions define angular compartments which in the specific embodiment illustrated, total five in number, though the number of such compartments may vary widely with the size and capacity of the unit desired.

Each compartment houses a brewing basket 41 which structurally comprises a trough 43 closed at its ends by end walls 45, 47 each carrying a pin 49 for mounting the same. At one end, the basket is supported by its pin in a plate 51 lying contiguous to the proximate end wall of the basket. Such plate has a laterally extending stub shaft 53 passing through a bearing 55 in the compartment wall. A pin 57 affixed to this end wall of the basket and entering a hole provided in the plate 51 will assure that any rotation of the stub shaft will cause corresponding rotation of the basket.

At the other end of the basket the supporting pin enters a socket formed in a retractible bearing 59 supported in an opening in the other side plate of the compartment, such retractible bearing being biased toward the basket by a compression spring 61 disposed about the inner end of the bearing between the side plate and an end flange. The fact that the bearing is retractible, permits of removal from and insertion of a basket in the basket wheel.

Each basket is formed of sheet material which may be either metal or plastic, and is perforated along the bottom of the trough and partially up the side walls of the basket for a distance which does not exceed the lowest expected level of a charge of coffee which the basket is designed to receive.

The basket wheel is driven by an electric motor 63 through a Geneva assembly 65, to impart to the wheel intermittent movement, that is fractional turns of the wheel with rest periods in between. The Geneva assembly involves a star wheel 67 affixed to the basket wheel shaft, and an intermittent actuating wheel and pin assembly 69 mounted on a control shaft 71 paralleling the basket wheel shaft and journaled in bearings carried by the front and rear walls of the casing.

The electric motor is preferably mounted on a bracket 73 in a lower rear corner of the casing and is drive-connected to the control shaft 71 by a drive belt 75 running over a sprocket 77.

The intermittent rotation of the basket wheel has for its purpose to sequentially position the individual baskets at a supply or loading station for the reception of a predetermined charge of coffee followed by the application of the proper amount of hot water sufficient to provide the desired brew.

Such loading station is disposed above the basket wheel and involves a hopper 79 supported on the narrow compartment sections 19 and 21 of the hot water chamber, by suitable brackets 81 affixed to the walls of the hopper.

Such hopper is made up of a lower trough portion 83 and an upper portion 85 which extends up through the cover of the casing and is provided with a suitable cover or cap 87.

Clearance between the hopper and the cover of the casing is sealed against escape of vapors by providing a circular trough 89 about the hopper to receive a sealing ring 91 of rubber or the like. A turned-down flange 93 about the edge of the opening through the cover of the casing is adapted to bear on the sealing ring under the weight of the cover and thus provide an efficient seal against escape of vapors to the outside of the casing.

At its lower end, the hopper terminates in opposed arcuate walls 95, 97 spaced to permit discharge from the hopper. Between and rotatably supported by these arcuate walls is a measuring element in the form of a cylinder 99 having a measuring groove 101 adapted when facing upwardly, to receive coffee from the hopper proper. The capacity of such groove is correlated to the maximum brew capacity of the unit and may be altered in the direction of reducing its capacity by an adjustable displacement block 103 slidably dovetailed in such groove.

Such adjustment is effected by an adjusting screw 105 journaled in the end of the measuring element with its head exposed in an opening 107 in the casing wall, and with its shank threaded into an end of the displacement block. The limit of adjustment inwardly is determined by a stop pin 109 set in the groove. A set screw 111 radially disposed adjacent the end of the measuring element, serves to hold the slidable block in adjustment. To preclude unauthorized tampering with such adjustment, a plate 113 is applied over the wall opening.

The rotatable mounting of the measuring cylinder 99 permits of dumping of the contents thereof into that basket immediately beneath it. To provide for periodic filling and dumping of the measuring element, in timed relationship to the intermittent movement of the baskets to the loading position, the measuring element is provided at one end with a sprocket 115, through which the measuring element is chain driven from the control shaft by a pair of drive chains 117 and 119 coupled through sprockets 121 and 122 on an intermediate shaft 123. Such drive, while it imparts continuous rotation to the measuring element, may be so timed as to bring the groove in the measuring element adjacent to or within a few seconds of the discharge opening in the hopper at the beginning of each cycle, that is at the time when a basket is moved to loading position. Thus essentially no time is lost in dumping a charge of coffee into the basket after such basket has been moved to loading position.

In the process of brewing coffee by the drip method, which is the process involved in the present invention, water at brewing temperature, that is at a temperature approaching that of boiling water, is poured over the coffee and permitted to trickle through.

In the present device, such water is supplied to the basket at the loading station by way of a pair of troughs 125 and 127 connected to a manifold 129 which in turn is connected by a pipe 131 to the hot water compartment, the height of which is sufficient to provide an operating head of water of the order of three or so inches with respect to the manifold.

The troughs are disposed on either side of the discharge opening from the hopper, where they will not interfere with the discharge of coffee from the measuring element, yet will be positioned to discharge water into the basket at the loading station.

Structurally each trough is of shallow rectangular construction and having a floor provided with a pair of rows of small perforations 133 to permit of a rapid dripping of water therefrom. To assure that such dripping shall be evenly distributed to the coffee in the basket below, I support edgewise, a thin strip 135 of material below each row of holes or perforations, in slightly spaced relationship to the bottom of the trough and provide each such strip along its lower edge, with a plurality of teats 137, preferably one located in line with each perforation. Such teats serve to preclude collection of the drippings at one end, and thus, by reason of their presence, the water will distribute itself rather uniformly among the various teats from which the same will be discharged.

The connection of the hot water feed pipe to the manifold is through a suitable fitting 139 threaded into a socket formed in one end of the manifold. Clamped in the bottom of the socket by the fitting is an orifice plate 141 backed up on either side by a gasket or washer 143, the orifice plate having a central orifice of less diameter than that of the flow passage into the manifold. Such orifice plate may be utilized to drop the pressure of the water flowing into the manifold, but may be eliminated under circumstances when the pressure is not otherwise too excessive.

The flow of liquid to the manifold for discharge into the troughs is controlled by means of a conical valve 145 disposed in the manifold at the inlet end and adapted to close such opening when in its seated position. The valve includes a stem 147 extending axially of the manifold through the other end thereof for connection to a valve opening control 149 which is timed to supply water at the proper interval in the brewing cycle of each succeeding basket in the device.

Such valve operating means involves a cam 151 mounted on the intermediate shaft 123 and keyed thereto. A link 153 formed with a slot 155 through which the intermediate shaft passes, is hingedly connected at one end to the exposed end of the valve stem, while at its other end, it carries a cam follower 157, which is maintained in contact with the cam surface by a valve return spring 159 disposed about the valve stem.

The cam is made adjustable by forming the same of a pair of disc-like halves 161 and 163 provided with alignable arcuate slots 165 and 167 therethrough. One cam section is keyed to the shaft, while the adjacent section is rotatably mounted on the shaft, but restricted in its rotational movement relative to the keyed section by a clamping screw 169 passing through the arcuate slots of both cam sections.

By loosening such screw, the rotatable half of the cam may be shifted within limits permitted by the slots, to alter the resulting cam contour, whereby to alter the timing and duration of the operation of the water release valve in the brewing cycle. Once an adjustment has been made, the clamping screw when tightened will serve to fix the cam contour in its adjusted position.

To realize a uniform water supply to each basket as it moves to loading position, the water level in the hot water chamber at each opening of the water supply valve 145 should be the same, and a float control shut-off valve may be utilized for such purpose. However, the same result may be accomplished more effectively through electrical control means and I prefer to utilize this type of control.

Such electrical control means may include a solenoid operated shut-off valve 171 installed in the water supply line 173 to the urn, the solenoid component 175 of such valve being connected across a power circuit 177 through the armature 179 of a relay 181. The winding 183 of such relay is in turn connected in an independent circuit which is coupled to the power line through a transformer 185, having a primary winding 187 and a secondary winding 189. Such auxiliary circuit includes aside from the relay winding 183 and the transformer secondary winding 189, a pair of electrodes 191 and 193 adapted to be bridged by the hot water when such water reaches a predetermined level in the hot water chamber.

Figure 13:
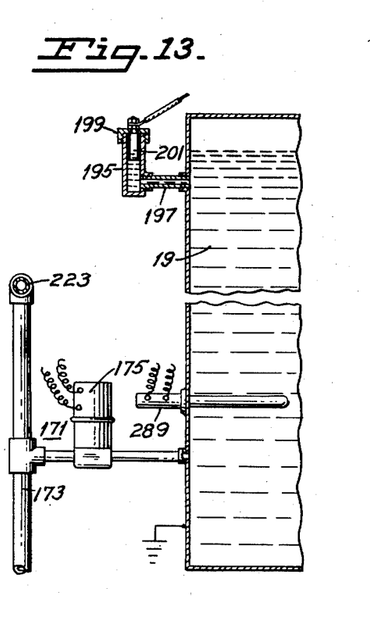
Figure 13 is a fragmentary view depicting a water level control feature of the device of Figure 1.

Structurally, one of such electrodes may take the form of an upright tube 195 (Figure 13) having flow connection with the hot water chamber through a small connecting pipe 197. The upper end of this tube electrode is closed by a cap 199 in which is mounted the second electrode in the form of a short rod 201 whose length is such as to reach to the desired water level. This second electrode is insulated from the tube electrode in any suitable manner.

Figure 15:
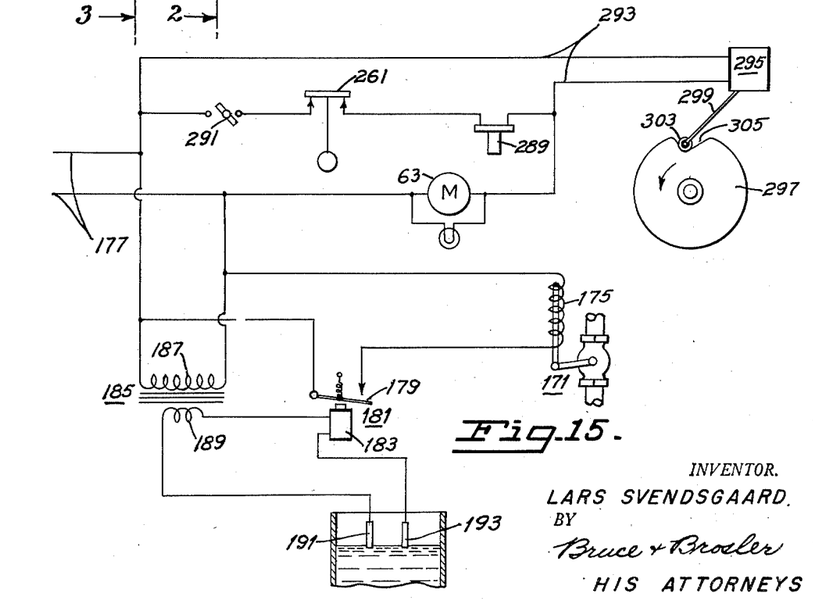
Figure 15 is a view depicting the electrical circuit involved in the control and operation of the device of Figure 1.

One of the electrodes is connected to one side of the secondary winding of the coupling transformer as shown while the other electrode is connected to one end of the relay winding, the other end of which will be connected to the other side of the secondary winding of the coupling transformer, all as illustrated in the circuit diagram of Figure 15. By grounding the urn casing and one side of the secondary winding of the coupling transformer, no direct wire connection is necsary to complete the circuit from this electrode to the transformer winding.

It has been found that ordinary tap water has sufficient conductivity at voltages at or below that of the power system, to energize the relay in the auxiliary circuit when such electrodes are bridged by the water in the hot water compartment.

The solenoid control valve 171 is one which is normally closed when its associated solenoid is not energized. When such solenoid is connected in the electrical circuit described, which is normally open during the energized condition of the relay winding, it becomes apparent that the solenoid control valve can open only when the relay becomes de-energized, that is when the water level in the hot water compartment is of insufficient height to bridge the electrodes. This fact introduces a safety factor into the control circuit, for upon failure of power, the solenoid control valve will shut off the supply of water to the urn and thereby preclude possible flooding of the same.

As an additional safety factor, to take care of a situation such for example as when the solenoid control valve itself should cease to function properly, I provide an emergency overflow pipe 203 connecting at its upper end to the hot water chamber at a point just above the cut-off level of the electrical control system just described. Such overflow pipe discharges into an overflow or drain compartment 205 in a lower corner of the casing, the floor 207 of which slopes to a drain pipe 209 for carrying off such liquid as may find its way into this chamber.

As soon as the hot water is admitted to the basket at the loading station, brewing of the coffee begins. The water percolating through the coffee grounds, passes through the perforations in the basket into the basket compartment from which it is enabled to flow into a brew chamber 211, when the Geneva rotates the basket wheel a fraction of a revolution to bring the next basket into position at the loading station.

It is rather important at this point in the operation of the device that the baskets which carry the brew ingredients, be stabilized against tilting with movement of the basket wheel, to avoid spilling of any of the contents thereof. For this purpose, each basket is counterweighted at one end. Such counterweight involves a vertically disposed strip 213, preferably of metal, affixed at an intermediate point thereof to the end wall of the basket, and carrying at its lower end below the center of gravity of the basket, a roller 215 of substantial weight, relatively speaking.

Assisting such counterweight in the stabilization of these loaded baskets, is a guide flange 217 extending laterally from the inner wall of the hot water compartment section 21 in position to be engaged by the upper end of the strip 213 in the vertical position of such strip. This guide flange thus constitutes a barrier against any tendency of a basket to tilt with movement of the wheel.

Brewing of coffee in a basket will continue until all the resulting brew drains from the basket, or until such basket arrives at a position above the drain compartment where provision is made for dumping the contents of such basket and rinsing or washing the same along with its compartment in the basket wheel to remove all grounds or sediment tending to remain therein.

The basket-tipping means for effecting discharge of the grounds from a basket as it approaches the washing station, utilizes the counterweight at the end of the basket in effecting this result. Extending laterally from the same inner side wall of the hot water compartment and into the path of movement of the roller component of the counterweight, is another guide flange 219. This extends from a point where tipping is to begin to a point where the tipping operation is to terminate, and is so inclined as to lift the roller during such movement, thereby causing the associated basket to tip and discharge its contents into the drain compartment.

In this drain compartment I provide a slidable drawer 21 terminating at an opening in the front wall of the casing. This drawer is adapted to catch the grounds discharged from the baskets, and is perforated to permit draining therefrom of any liquid.

The completion of the tipping operation is caused to coincide with an interval of rest of the basket wheel between movements of the basket wheel, thereby causing the basket to remain in its tipped position for an interval of time during which a thorough rinsing or washing of the basket and its compartment may be effected.

In washing such basket and its compartment in the basket wheel, a perforated spray pipe 223 connected to the main water supply pipe is disposed above the overflow or drain compartment parallel to the axis of the basket and in a position to most effectively direct its spray into such basket and compartment, such spray automatically draining off into the drain compartment. In this connection, the angularly deflected end portions 39 of the basket wheel partitions serve to guide the draining water into the drain compartment and at the same time preclude such water from spraying or draining off into the brew compartment 211.

A small perforation or weep hole 225 at the bend in each partition offers an opportunity for continued draining of the rinse water, should any remain after the basket has been moved from the washing station.

The rinsing or washing operation is timed to occur with the arrival of the basket at the washing station, and such timing is controlled by a cam controlled valve assembly 227 in the spray pipe connection to the main supply line.

Structurally, the valve may involve a vertically disposed tubular casing 229 providing for communication between the spray pipe and its connection to the main supply line, such connection being normally closed off by a valve 231 having a valve stem 233 extending axially of the casing and terminating at its upper end in a mounting yoke 235 for a cam follower 237. A coil spring 239 about the valve stem and bearing against the cam follower mounting yoke, biases the valve in the direction of closing and at the same time urges the cam follower into engagement with a valve control cam 241 on the control shaft 71. The cam is formed with a contour such as to cause opening of the valve during the proper time period in the operating cycle of the machine.

The brew which is discharged from the basket wheel during movement of the basket from the loading station to the washing station drops into the brew compartment 211 as previously indicated, such compartment being defined primarily by the inner walls of the hot water compartment and an elevated bottom 243 which permits the hot water in the hot water compartment to substantially surround the brew compartment and thereby maintain the brew at an elevated temperature.

The brew level, or in other words the volumetric capacity of the urn, may be adjusted to fulfill anticipated demands on the machine, by brew level control means embodied in the machine for accomplishing this purpose. Such control means involves a float 245 suspended with its stem 247 in a guide tube 249 by a flexible wire cable 251 extending over a guide pulley 253 on the lower portion of the hopper, to the free end of a flexible leaf spring 255 mounted on the end wall 7 of the casing. Affixed to the cable is a nut or collar 257 adapted to abut against a switch arm 259 when the cable is tensioned sufficiently to flex the leaf spring 255. This switch arm carries one contact of a micro-switch 261, which is of the normally open type. The calibration of the spring 255 is such that the free weight of the float will be sufficient to hold the movable contact of the micro-switch in engagement with the fixed contact.

Accordingly in the absence of any buoyant force applied to the float, this micro-switch will normally remain closed. On the application of a buoyant force to the float, as when the brew rises sufficiently to carry the float on the surface thereof, the restoring action of the leaf spring is then free to withdraw the movable contact from engagement with a fixed contact of the micro-switch and thereby open such switch.

The level at which such opening of the micro-switch occurs may be manually adjusted by a knob 263 on the front wall of the casing, such knob having a stem 265 extending through the front wall. At the end of such stem is mounted a moment arm 267 which carries at its free end, a pulley 269 over which runs the cable 251. By angularly adjusting the knob, the elevation of the float in space may be adjusted, and by so adjusting the elevation of the float in space, the opening of the micro-switch may be caused to occur at various levels in the brew compartment up to its maximum permissible level.

The minimum level at which such control may be exercised will be determined by the lowest level at which the float will be floated. By providing a sump 271 in the floor of the brew compartment into which the float may be lowered by manipulation of the control knob 263, the minimum level of control may be substantially lowered, even to the floor of the compartment if desired.

The control knob may be provided with a pointer or indicator 273 which is angularly movable with the knob over a scale 275 provided on the front wall of the urn, which scale may be calibrated in terms of the gallonage capacity of the brew compartment for different levels therein.

The maximum capacity of the brew compartment may be fixed by an overflow tube 277 extending from the desired maximum level in the brew compartment, through intervening walls to the overflow or drain compartment.

A sight tube 279 may be mounted on the front wall of the urn to indicate existing brew levels, while a spigot 281 at the lower end thereof provides connection to the brew chamber for the withdrawal of brew as needed. In like manner, a sight tube 283 and spigot 285 are provided for the hot water compartment.

The uniform preparation of good coffee requires that the temperature of the hot water supplied to each basket, approach within a matter of a few degrees of the boiling point of water. Accordingly, should the temperature of the hot water in the urn for some reason or other drop below the brewing range of the hot water, it then becomes desirable that the operation of the urn should automatically come to a stop until proper water temperature can be reestablished.

With this in mind, I mount a thermostat 289 in the wall of the hot water compartment of the urn and connect such thermostat in an electrical control circuit along with other electrical safety features embodied in the machine. Thus referring to the electrical circuit illustrated in Figure 15 of the drawings, the drive motor 63 is connected to the power system 177 through a series connection of the thermostat 289, the micro-switch 261, and a manual operated snap switch 291, thereby requiring for continuous operation of the drive motor, that all these series connected circuit make-and-break devices be closed. Should the temperature of the hot water drop below the brewing range, this circuit to the motor will become opened and in the absence of other factors, will cause shut-down of the machine. Also when the level of the brew reaches its maximum desired level, as determined by the adjustment of the control knob 263, the machine will in like manner shut down by reason of the opening of the micro-switch. The manually operated switch may of course be relied on to shut down the operation of the machine at any other time.

However, should an occasion arise when either the thermostat or the micro-switch opens the circuit to the motor, it is my desire that the machine shall not shut down immediately upon the opening of such circuit, but that the machine shall continue to function for the completion of the prevailing cycle of its operation. With this in mind, I provide an auxiliary holding circuit 293 shunting the series connected thermostat, micro-switch and manual operated switch, such holding circuit including a switch 295 operated from a control cam 297 keyed to the control shaft 71.

The switch 295 is one which is normally spring loaded in the direction of its open position with one of its terminals adapted to be urged into contact with the other by external pressure applied thereto. Such external pressure may be applied thereto by a lever 299 pivoted at one end to a bracket 301 on the switch while at its other end, the lever carries a cam follower 303 in engagement with the control cam.

Such control cam is circular in contour except for a notch 305 at one point in its periphery, into which the cam follower is adapted to drop during each revolution of the cam. The location of this notch is such as to coincide with the completion of an operating cycle of the machine when the cam follower drops therein. As the cam follower rides on the circular periphery of the cam, the lever will be held in pressure engagement against the contact of the switch thus maintaining the switch closed until the cam follower drops into the notch to free the switch contact from such pressure to thereby permit opening of the switch.

The time interval between such openings of the switch 295 constitutes a measure of the operating cycle of the machine, which in point of time, also constitutes a measure of the brewing cycle, though it will be appreciated that the brewing cycle includes not only the actual brewing time, but also the period for loading the coffee into a basket and the movement of the basket which results in the emptying of the brew into the brew chamber, as well as a brief period of idleness before loading the coffee.

Such brief period is gauged by the time it takes for the cam follower 303 to ride out of the notch of the cam 297. This is to assure that once the loading of the coffee is started, the brewing cycle will be completed. Were the loading of the coffee to begin with movement of the cam follower while still in the notch; and the manual switch 291, or the brew level switch 261, or thermostat switch 289 opened before this movement is completed, it will become evident that the auxiliary holding circuit, not being as yet closed, the prevailing brewing cycle will be interrupted and will not be completed.

Figure 1:
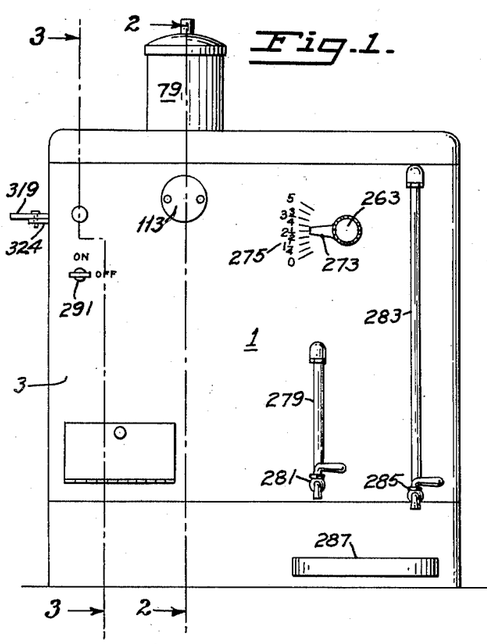
Figure 1 is a front elevational view of a coffee urn embodying the features of the present invention.
Figures 2, 3:
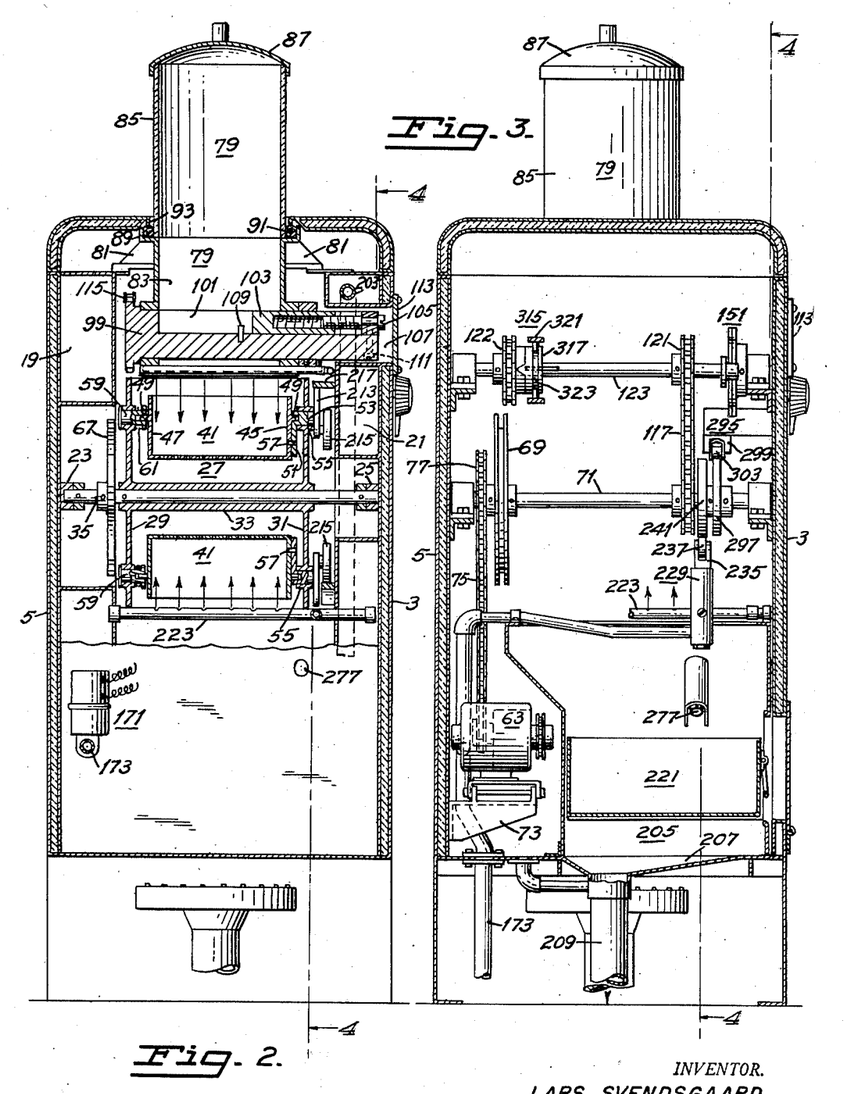
Figure 2 is an elevational view in section, taken in the plane 2—2 of Figure 1.
Figure 3 is an elevational view in section, taken in the plane 3—3 of Figure 1.
Figure 4:
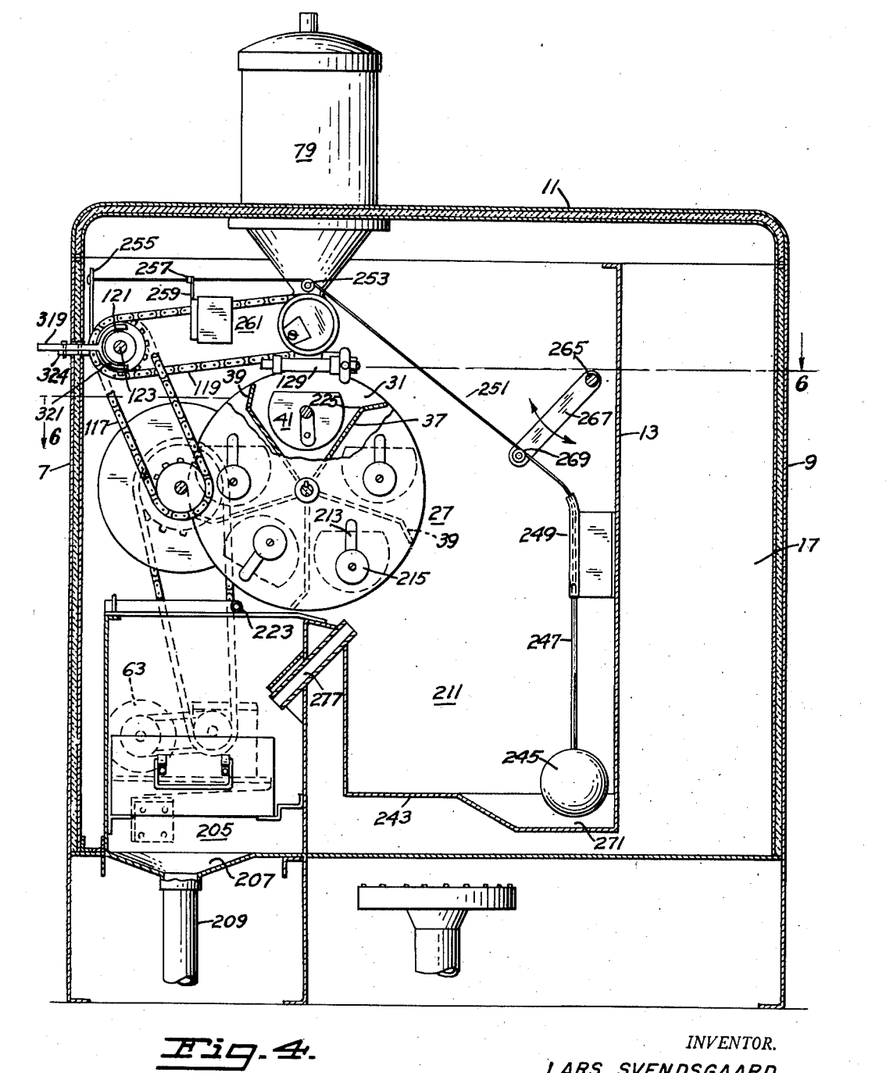
Figure 4 is an elevational view in section, taken in the plane 4—4 of Figures 2 and 3.
Figure 5:
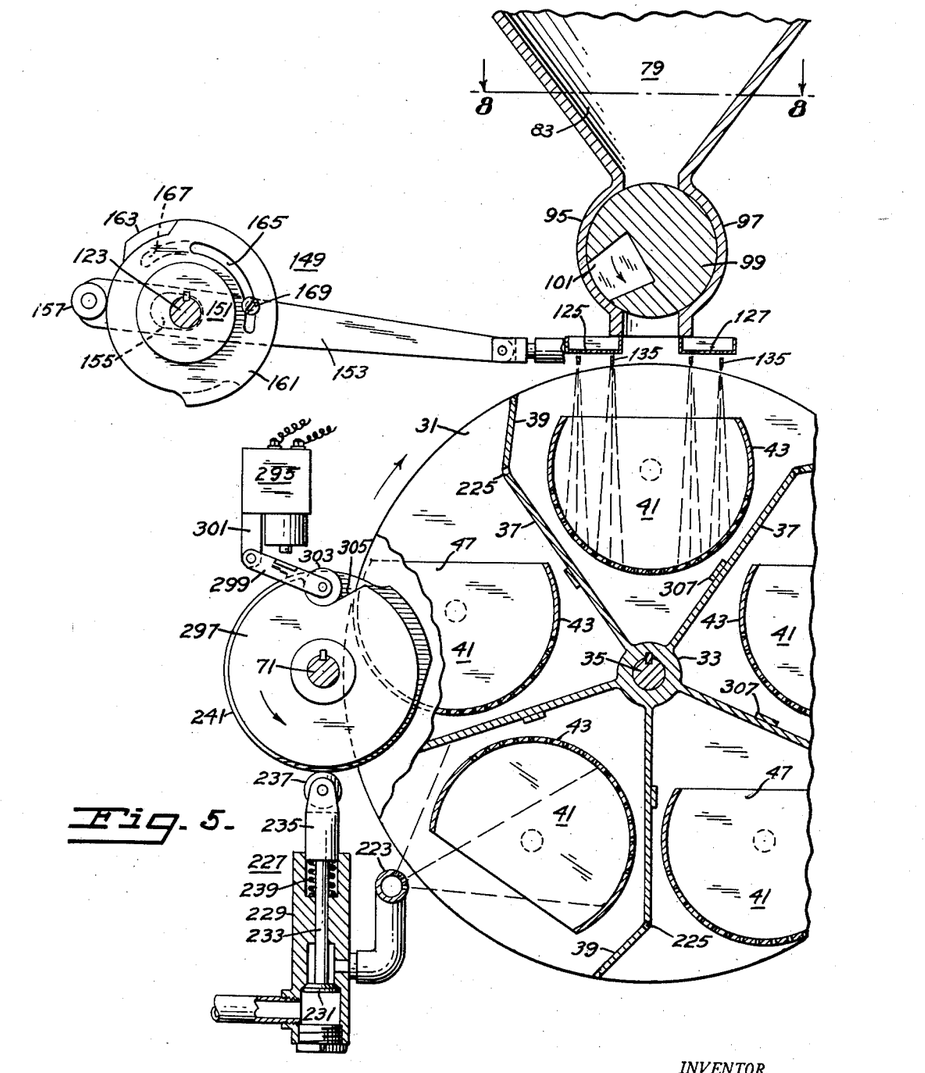
Figure 5 is a fragmentary enlarged view, partly in section, depicting internal features of the device of Figure 1.
Figure 6:
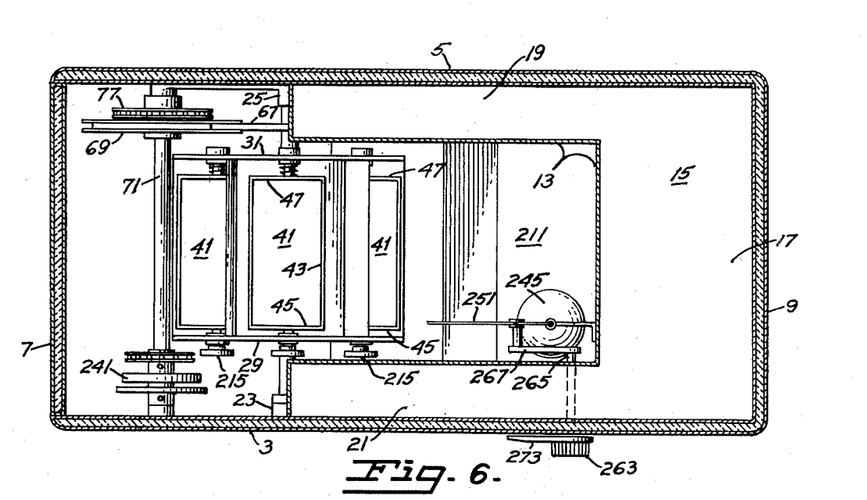
Figure 6 is a horizontal view in section, taken in the plane 6—6 of Figure 4.
Figure 7:
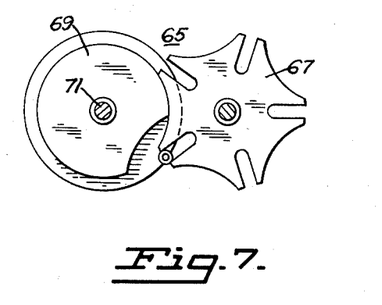
Figure 7 is a view of a Geneva drive employed in the operation of a basket wheel illustrated in section in Figure 5.
Figure 8:
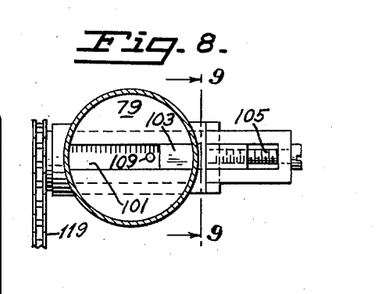
Figure 8 is a view in section through the hopper in plane 8—8 of Figure 5 and showing a measuring element in position to receive coffee from the hopper.
Figure 9:
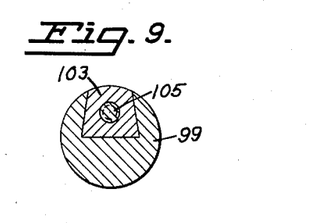
Figure 9 is a view in section transverse of the measuring element in the plane 9—9 of Figure 8.
Figure 10:
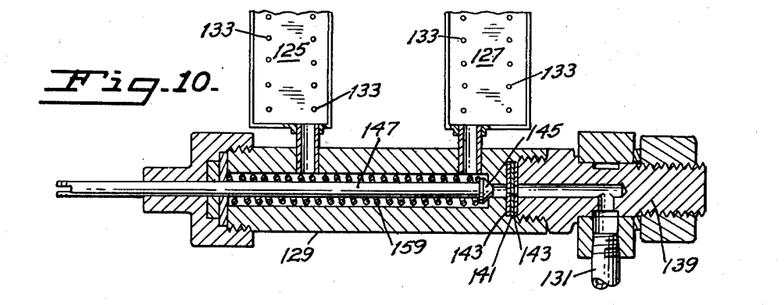
Figure 10 is a view in section of a water supply control to the individual baskets supported in the basket wheel of Figure 5.
Figures 11, 12, 14:
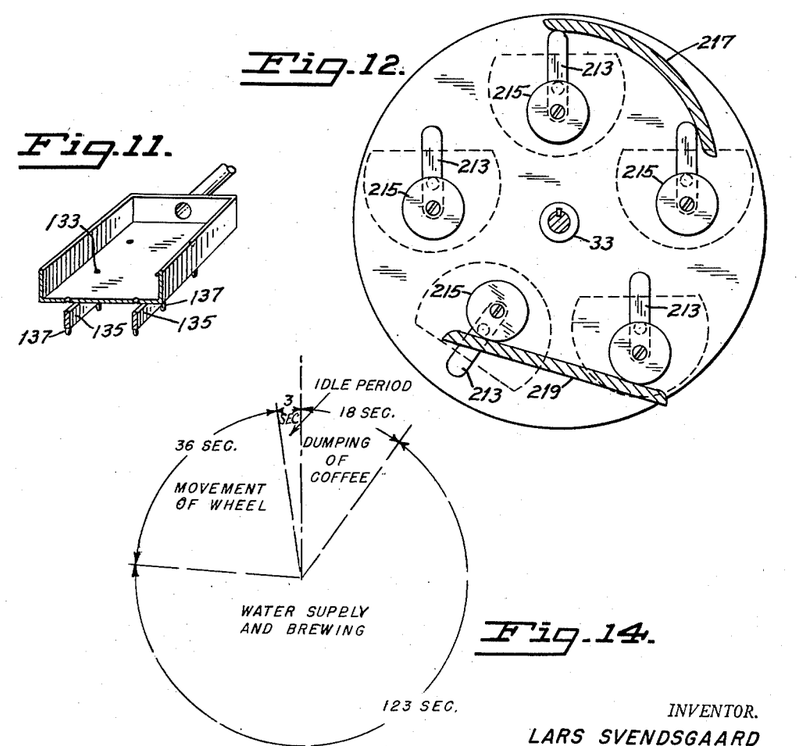
Figure 11 is a fragmentary three dimensional view of a component of the basket water supply control of Figure 10.
Figure 12 is a view depicting a basket stabilizer and tipping means employed in association with the baskets of the basket wheel of Figure 5.
Figure 14 is a view depicting schematically, an operating cycle of the device of the present invention.

When the operating cycle of the machine is adjusted to a three minute basis, the brewing cycle will preferably be divided up in the manner indicated in Figure 14. Thus, allowing a 3 second period for the cam follower to ride out of the notch and cause the holding circuit switch to close, the measuring cylinder is timed to then start dumping a charge of coffee into the basket at the loading station. A period of 18 seconds is allowed for this dumping operation, following which the water release valve is timed to open and supply hot water from the water compartment. This should continue for a period of 123 seconds, at which time the basket wheel will rotate a portion of a revolution; e. g., a fifth of a revolution where there are five baskets. During this partial rotation, the brew collecting in the wheel compartment will spill into the brew chamber. When the operating cycle of the machine is established on a three minute basis, such fifth of a revolution of the wheel will consume 36 seconds of time.

A sediment bar 307 affixed to the discharge surface of each compartment serves to trap sediment which may have dropped through the perforations in the basket during brewing.

The time divisions of the brewing cycle as given, are merely illustrative of one cycle which has been found to give good results with most grinds and blends of coffee. However, such periods are subject to adjustment to secure best results with any particular grind or blend, and this may be necessary, as I have found that the percolation rate of the water through the coffee will vary widely with different grinds and blends, which of course varies the time of brewing contact between the water and the coffee; and unless proper adjustments are made, a good brew cannot be expected.

Figure 16:
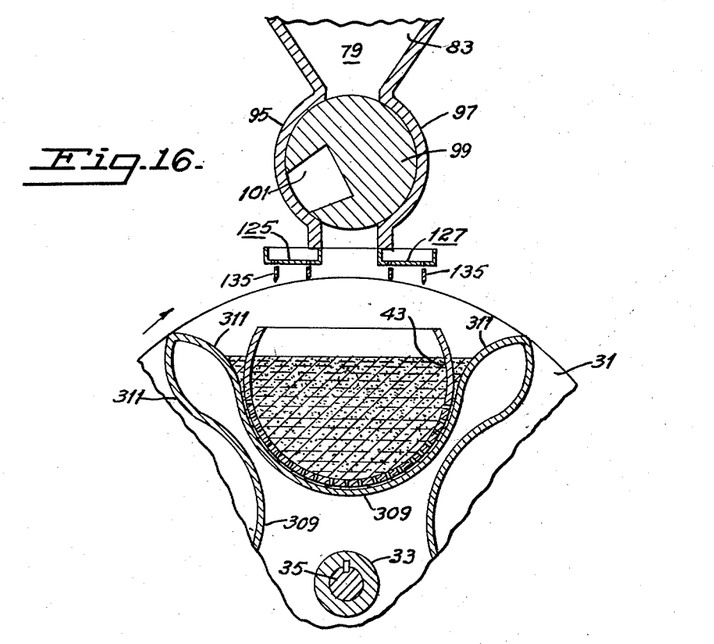
Figure 16 is a view depicting a modified form of basket wheel.

The modified basket wheel of Figure 16 is so constructed as to eliminate necessity for the consideration of this problem. This basket wheel differs from the other principally in forming each basket wheel compartment by a partition 309 following the contour of the lower half of the basket, and disposed so as to leave but a slight spacing between it and its associated basket. This means that very little of the water can escape from a basket until the wheel is partially rotated to bring the following basket to the loading station. During such movement of course, the brew is permitted to flow from the wheel compartment into the brew chamber. The significance of all this lies in the fact, that the duration of contact between the water and coffee will be essentially the same regardless of the grind or blend, and therefore, once the proper brewing time has been established in the machine, there will be little need for further adjustment by reason of any variation in the coffee used.

Figure 17:
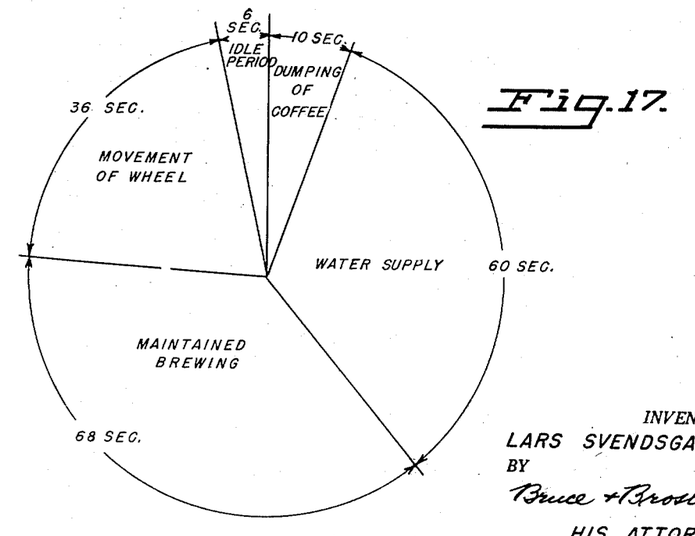
Figure 17 is a view depicting a brewing cycle for the wheel of Figure 16.

The modified basket wheel just described lends itself to a brewing cycle substantially as depicted in Figure 17. Based on a 3 minute operating cycle of the machine, the control shaft cam will be designed to allow 6 seconds for closing of the holding circuit switch, following which 10 seconds is allowed for dumping a charge of coffee into the basket. Hot water is then turned on for a period of 60 seconds and permitted to stand for a period of 68 seconds, when the Geneva will function to rotate the wheel to the next basket, during which the brew will be spilled into the brew chamber from the compartment of the basket under consideration.

The partition forming the compartment of the modified wheel, is preferably formed with a reverse bend 311 at each end to join up with the partitions forming the adjacent compartments. In fact, the entire series of partitions may be formed from a continuous strip of material. In either event, the wheel construction is not only thereby simplified over the previously described wheel, but the contour of each partition is such as to facilitate washing, besides making it unnecessary to provide weep holes for draining.

It is within the contemplation of the present invention, to include as a component of the machine, mechanism for grinding coffee in the bean as and when needed, in lieu of storing a quantity of ground coffee as previously indicated. In such case, the grinding mechanism will be positioned either at the previously designated loading station or above the basket position preceding said loading station.

A machine of the above described character, may require periodic cleaning, at which times, it is not desired to brew coffee. For this purpose, I introduce a clutch 315 into the drive connection between the intermediate shaft 123 and the sprocket 122 which carries one end of the chain 119 leading to the measuring cylinder.

The clutch involves the sprocket 122 as one element, which is freely mounted on the shaft and provided with a V groove in that side facing the opposing clutch element 317. This latter element is slidably keyed to the shaft and controlled by a handle 319 extending through the urn wall, wherein it is pivoted, and within the casing, the handle terminates in a yoke 321 engaging in a peripheral groove 323 in the clutch element 317. This clutch element has a complementary rib adapted to fit the V groove of the opposing sprocket element of the clutch and is normally biased into clutching engagement therewith, and held therein by a pin through the handle and a plate 324 disposed below the handle.

Upon temporarily disconnecting the clutch, the measuring cylinder is rendered inoperative without incapacitating the remainder of the machine. Thus the hot water supply to the baskets as well as the washing spray may function to thoroughly clean the basket wheel and flush out the brew chamber.

From the above description of my invention, it is apparent that the same fulfills all the objects previously recited, and while I have described and illustrated the same in great detail, the invention is subject to alteration and modification without departing from the specific details illustrated and described. The machine, furthermore, is not limited in its use to the brewing of coffee, but may, if desired, be employed for the preparations of other brews. Accordingly, I do not desire to be limited in my protection to such details except as may be necessitated by the appended claims.

I claim:

1. In a coffee-brewing device, the combination of: a wheel mounted to rotate in a vertical plane about a horizontal axis, said wheel having two end walls and a plurality of generally-radial partitions disposed therebetween, so as to provide a plurality of compartments open along the periphery thereof; and a brewing basket pivotally suspended between the end walls of each compartment, so that each said basket normally remains horizontal as said wheel rotates, each said basket having a perforated lower end and an open upper end, whereby ground coffee and water may be placed in said basket, and the brew will seep through the perforated lower end and into said compartment, and when said wheel is turned to a different position and the radial walls are tipped, the brew will drain out of said compartment while the basket holds the coffee grounds in the basket for later disposition.

2. In a coffee-brewing device, the combination of: a wheel mounted to rotate in a vertical plane about a horizontal axis, said wheel having walls at each side and a plurality of generally-radial partitions disposed therebetween, so as to provide a plurality of compartments open along the periphery thereof; a brewing basket pivotally suspended between the side walls of each compartment, so that each said basket normally remains horizontal as said wheel rotates, each said basket having a perforated lower end and an open upper end, whereby ground coffee and water may be placed in a basket when its compartment is at the top of said wheel, the brew seeping through the perforated lower end and into said compartment; a reservoir for brewed coffee disposed beneath and on one side of said wheel; and means for rotating said wheel intermittently, so that after a desired brewing time the brew will drain from said compartment into said reservoir while the basket retains the coffee grounds.

3. The device of claim 2 in which there is a container to receive coffee grounds and means for tipping each basket as said wheel rotates it into a position overlying said grounds-receiving container so as to dump the basket's contents therein.

4. The device of claim 3 in which said tipping means include a cam track positioned adjacent said wheel, an axle rigidly secured to each said basket and journaled through said side walls, and a cam follower rigidly secured to each said axle so as to follow said track and thereby rotate the baskets into their dumping position when the basket overlies the grounds-receiving container.

5. The device of claim 3 in which there is a rinse means adapted to direct a spray of water into said basket and its compartment when it is positioned over said grounds-receiving container.

6. In a coffee-brewing device, the combination of: a wheel mounted to rotate in a vertical plane about a horizontal axis, said wheel having walls at each side and a plurality of generally-radial partitions disposed therebetween, so as to provide a plurality of compartments open along the periphery thereof; a brewing basket pivotally suspended between the side walls of each compartment, so that each said basket normally remains horizontal as said wheel rotates, each said baskets having perforated walls; means for measuring ground coffee into said basket when its compartment is at the top of said wheel; means for measuring hot water into said basket thereafter at the same position; a reservoir for brewed coffee disposed beneath and on one side of said wheel; and means for rotating said wheel intermittently, so that after a desired brewing time the brew will drain out of said compartment into said reservoir while the baskets hold the grounds for later disposition.

7. The device of claim 6 in which there is a container to receive coffee grounds and means for tipping each basket as said wheel rotates it into a position overlying said grounds-receiving container so as to dump its contents therein.

8. The device of claim 7 in which there is rinse means adapted to direct a spray of water up into said basket and said compartment while basket is in dumping position so as to clean all grounds therefrom.

9. The device of claim 6 in which the water measuring means includes a trough having a perforated bottom overlying the top of said wheel, means to dispense hot water into said trough, strip material disposed beneath said trough adjacent the lines of perforations, and projections on said strip material to collect the water from said perforations and drip it evenly onto coffee in the basket.

10. A coffee-brewing device including the combination of: a wheel mounted to rotate in a vertical plane about a horizontal axis, said wheel having end walls and a plurality of generally radial partitions disposed therebetween, so as to provide a plurality of compartments open along the periphery thereof; a brewing basket pivotally suspended between the end walls of each compartment, so that each said basket normally remains horizontal as said wheel rotates, each said basket having perforated walls; a storage container for ground-coffee; means for measuring coffee therefrom into said basket when its compartment is at the top of said wheel; a storage container for hot water; means for measuring water into said basket at the same position; a reservoir for brewed coffee disposed beneath and on one side of said wheel; means for rotating said wheel to advance said compartments in one position, so that the following compartment comes up to the top of the wheel and the brew will drain out of said compartment into said reservoir, the basket then retaining the grounds for later disposition; and an electric circuit including a timer and a motor, and controlling said device so as to actuate its parts to successively actuate the coffee measuring means and the water measuring means, then after a period of steeping, to actuate said wheel-rotating means.

11. The device of claim 10 in which there is a container to receive coffee grounds, means for tipping each basket as said wheel is rotated beyond the reservoir and to a position overlying said container, so as to dump its contents therein; and rinse means actuated by said timer control to spray water into said basket and compartment at that time.

12. In a coffee-brewing device, the combination of: a wheel mounted vertically to rotate about a horizontal axis, said wheel having side walls and a plurality of partitions disposed therebetween so as to provide a plurality of compartments open along the periphery thereof, said partitions being generally radial but interconnected by a cylindrical arc; and a cylindrical brewing basket supported on the cylindrical arc of each compartment, so that each said basket normally remains horizontal as said wheel rotates, each said basket having perforated walls, whereby ground coffee and water may be placed in said basket, and when said wheel is turned to a different position and the radial walls are tipped the brew will drain out of said basket and said compartment while the basket holds the coffee grounds for later disposition.

LARS SVENDSGAARD.

REFERENCES CITED

The following references are of record in the file of this patent:

UNITED STATES PATENTS

| Number | Name | Date |
|---|---|---|
| 1,551,855 | Svendsgaar | Sept. 1, 1925 |
| 1,668,540 | McAllen | May 1, 1928 |
| 1,813,872 | Bausman | July 7, 1931 |
| 1,822,433 | Brand | Sept. 8, 1931 |
| 2,014,325 | Grilli | Sept. 10, 1935 |
| 2,016,281 | Harper et al. | Oct. 8, 1935 |
| 2,149,270 | Burgess | Mar. 7, 1939 |
| 2,194,807 | Oyen et al. | Mar. 26, 1940 |
| 2,206,424 | Oyen | July 2, 1940 |
| 2,315,777 | Denton | Apr. 6, 1943 |
| 2,517,073 | Alvarez | Aug. 1, 1950 |

FOREIGN PATENTS

| Number | Country | Date |
|---|---|---|
| 393,659 | Great Britain | June 12, 1933 |
| 542,825 | France | May 22, 1922 |
| 589,770 | France | Feb. 27, 1925 |